Feb. 2, 1937. N. I. SILVERMAN 2,069,282
BUMPER
Filed July 28, 1934
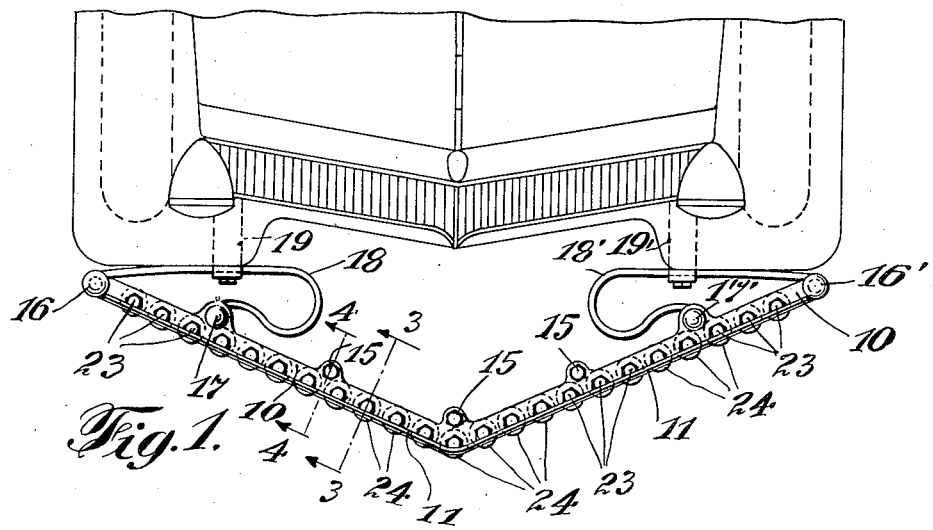
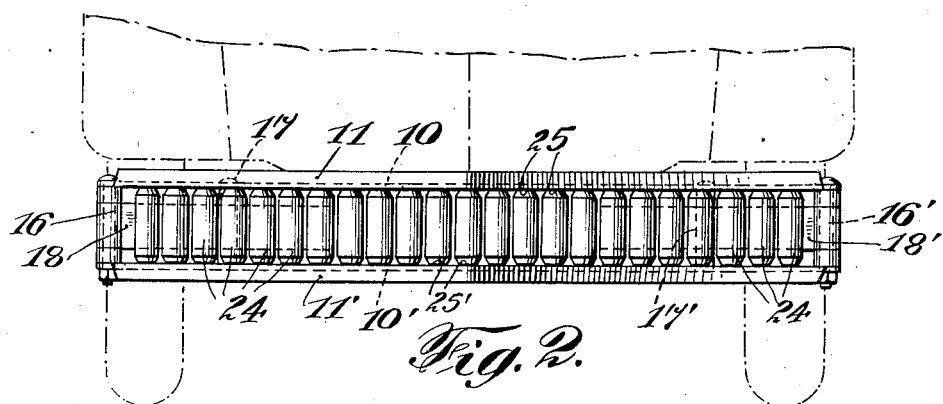
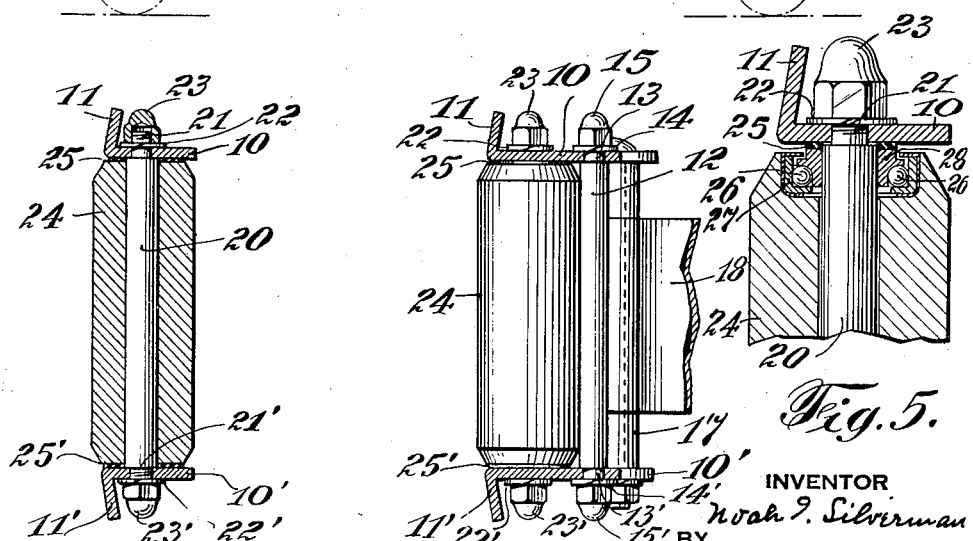
INVENTOR
Noah I. Silverman
BY
ATTORNEY Patented Feb. 2, 1937

2,069,282

UNITED STATES PATENT OFFICE 2,069,282

BUMPER

Noah I. Silverman, New York, N. Y.

Application July 28, 1934, Serial No 737,325

3 Claims. (Cl. 293—55)

This invention relates to a safety device for the purpose of reducing damages to automobiles, locomotives, electric trains, electric street cars, motor boats and steamships, and injuries to passengers travelling therein, resulting from collisions with each other or with obstacles.

The main object of this invention is to provide automobiles, motor boats and steamships with bumpers which will direct the colliding conveyances into different directions, whereby the shock of the collision is considerably reduced. Another object of the present invention is the protective effect of the bumper on the colliding conveyances and on the passengers travelling therein. A further object of the present invention is to provide automobiles, locomotives, electric trains, electric street cars, motor boats and steamships with bumpers which will facilitate the removal of colliding obstacles and reduce the shock of collision, damages to the colliding vehicles and watercrafts and injuries to the passengers travelling therein. The bumper of the present invention is to be attached to the corresponding front and rear frame members of automobiles, locomotives, electric trains, electric street cars, motor boats and steamships.

While I illustrate the device of my invention as applied to an automobile, I wish to be understood that my device is not limited in its application to such a vehicle.

In the accompanying drawing illustrating one form of the device of my invention, similar parts are designated by similar numerals.

Figure 1 is a plan view of one form of the device of my invention applied to an automobile.

Figure 2 is a front view of Figure 1.

Figure 3 is a section taken on the line 3—3 of Figure 1.

Figure 4 is a section taken on the line 4—4 of Figure 1.

Figure 5 is a broken vertical section of a modified form of my device.

The device of my invention illustrated in the accompanying drawing consists of an upper supporting member 10—11 and a lower supporting member 10'—11', both angularly inclined in their centers, as shown in Figure 1, maintained in spaced parallel and horizontal position with respect to each other by means of a plurality of bolts 12, 12, each having reduced threaded terminal portions 13, 13' passing through openings in the supporting members 10, 10' and maintained in position by the lock-nuts 14, 14' and the threaded caps 15, 15'.

The supporting members 10—11 and 10'—11' are also spaced by two similar bolts 16, 16' and two additional similar bolts 17, 17'. The bolt 16 carries a sleeve to which is attached one end of a spring 18, the other end of the spring 18 being attached to a sleeve carried by the bolt 17, a spring 18' is similarly attached to sleeves carried by the bolts 16', 17'. The springs 18, 18' are suitably attached to the frame ends 19, 19' of an automobile as indicated in the drawing.

Positioned vertically between the supporting members and carried thereby is a plurality of rods 20, 20, each having reduced threaded terminals 21, 21' passing through openings in the supporting members 10, 10' and maintained in position by the lock-nuts 22, 22' and the threaded caps 23, 23'. Positioned around each rod 20 and revoluble thereon is a metal roller 24 of cylindrical form reduced at its ends and extending beyond the forward face of the supporting members 10—11 and 10'—11'. The surface of the roller may be smooth, rough or coated. Rubber washers 25, 25' separate each roller 24 from the supporting elements 10, 10' to prevent rattling between these metal elements.

The modified form of my device shown in Figure 5 has ball bearings 26, 26 maintained between the run-way members 27, 28, the member 27 being fixedly attached to the roller 24, and the member 28 being fixedly attached to the rod 20.

I do not limit myself to this particular form of ball-bearing device as other forms may be employed.

It will thus be seen that when two automobiles thus equipped collide, the initial impact is partially absorbed by the springs 18, 18' and, because of the inclination of the bumper faces, the automobiles will be directed in opposite angular directions from each other, the revolution of the rollers assisting toward this accomplishment and thus entirely overcoming the end-to-end total impact incident to the present employed bumpers.

The advantages of the bumper of the present invention over the various kinds in use now are readily seen from the fact that whereas, the bumpers now in use are in their entire length subjected to the full force of the shock produced by collisions of automobiles, the bumper of my invention is subjected to a fraction only of the force of the shock resulting from collision by reason of the following facts, that its collision-area is limited to 50% of its length as against 100% of the length of the bumpers now in use and, that the force of the shock is directed toward the inclined surface of the bumper revolving in the direction of the colliding automobiles whereby part of the force is directed along the inclination and, thirdly, that the colliding automobiles are frequently enabled to proceed along the inclination without being brought to a stop and without interrupting their moving force, especially in cases when the colliding automobiles travel with great speed. Thus, in case of collisions the force of the shock imparted on automobiles provided with the bumper of my invention and on passengers travelling therein, is considerably reduced and automobiles and passengers are far more protected against dangerous collisions with this bumper than with the bumpers in general use at the present time.

The various elements of my invention, as shown and described, may be modified without going beyond the scope of my invention; revolving balls may be employed instead of revolving rollers; the angular inclination of the supporting members may be varied; other methods may be employed for positioning the supporting members with respect to each other; other spaced positions for the supporting members with respect to each other may be maintained; other springs may be employed, or the device may be directly applied to the vehicle without the interposition of springs; the number of supporting members may vary, and other mechanical methods best suited for particular requirements may be employed.

What I claim is:

1. In a vehicle bumper, in combination, similar upper and lower members spaced from each other, resiliently yieldable means adapted to attach said members to a vehicle to extend across an end of the latter, said means being adapted to provide for the yielding movement of said members toward the vehicle throughout their length, means adapted to maintain said members in fixed position with respect to each other, and a plurality of bumper elements disposed between said members and carried thereby to rotate about vertical axes, said elements being arranged in a series extending longitudinally along said members, said members having outer faces beyond which said bumper elements extend, said outer faces and said series being similarly of substantially a V-shape longitudinally thereof between their opposite ends with their median salient angle directed outwardly away from the vehicle and being inclined away from the apex of such angle to their opposite ends.

2. In a vehicle bumper, in combination, similar upper and lower members spaced from each other, resiliently yieldable means adapted to attach said members to a vehicle to extend across an end of the latter, said means being adapted to provide for the yielding movement of said members toward the vehicle throughout their length, a plurality of rods extending vertically between said members and adapted to maintain them in a fixed position with respect to each other, said rods being arranged in a series extending longitudinally along said members, a corresponding series of bumper elements rotatable respectively upon said rods, said members having outer faces beyond which said bumper elements extend, said outer faces and said series of bumper elements being similarly of substantially a V-shape longitudinally thereof between their opposite ends with their median salient angle directed outwardly away from the vehicle and being inclined away from the apex of such angle to their opposite ends.

3. In a vehicle bumper, in combination, similar upper and lower metal members spaced from each other, means adapted to attach said members to a vehicle to extend across an end of the latter, a plurality of rods extending vertically between said members and adapted to maintain them in a fixed position with respect to each other, said rods being arranged in a series extending longitudinally along said members, a metal bumper element rotatable upon each of said rods, said members having outer faces beyond which said bumper elements extend, and anti-rattlers interposed between said members and the ends of said bumper elements.

NOAH I. SILVERMAN.